Jan. 1, 1963  J. VOLLMER  3,071,038
APPARATUS TO ACCURATELY AND CONTINUOUSLY MEASURE CHANGES
OCCURRING IN THE SPECIFIC GRAVITY
AND COMPOSITION OF A FLUID
Filed June 2, 1959
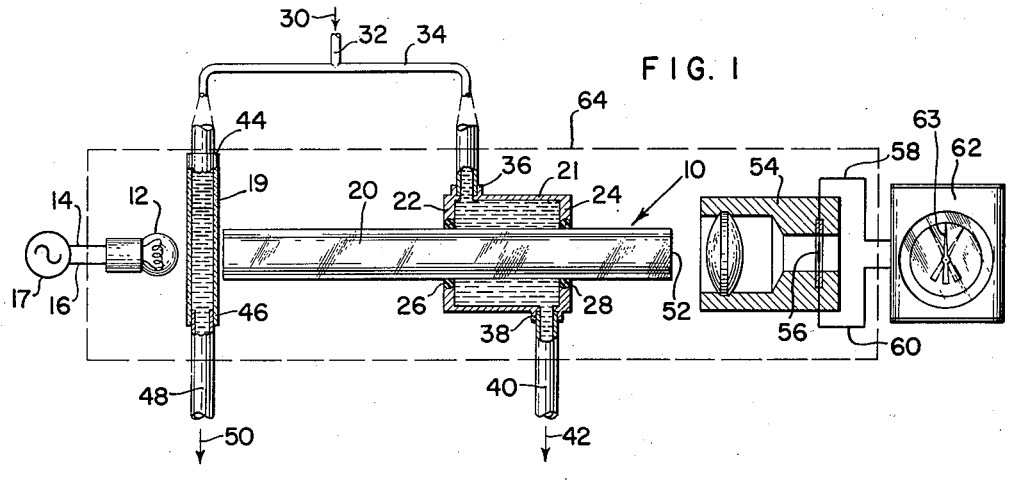
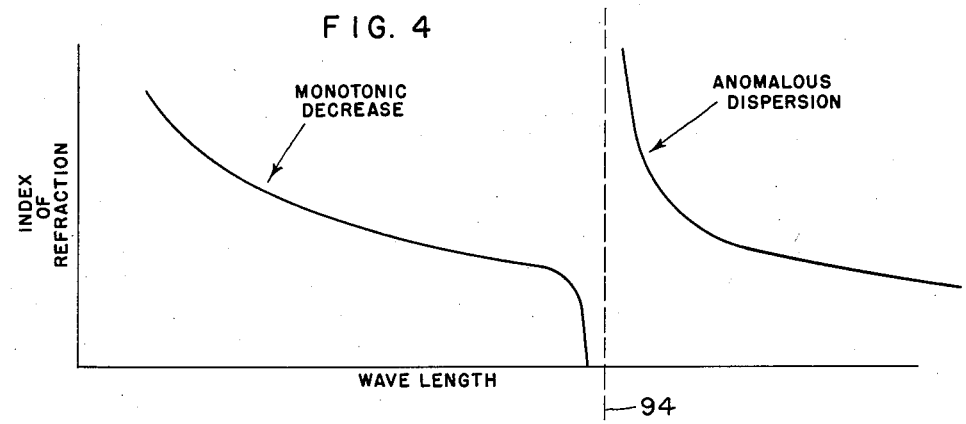
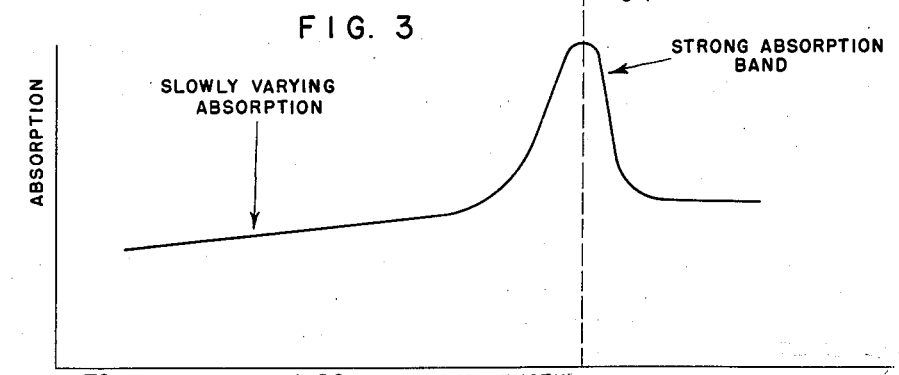
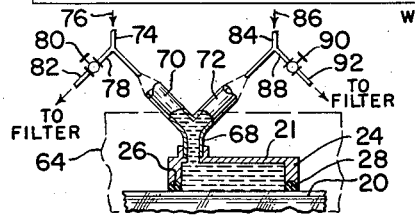
INVENTOR.
JAMES VOLLMER
BY
ATTORNEY.

United States Patent Office 3,071,038
Patented Jan. 1, 1963

3,071,038
APPARATUS TO ACCURATELY AND CONTINUOUSLY MEASURE CHANGES OCCURRING IN THE SPECIFIC GRAVITY AND COMPOSITION OF A FLUID
James Vollmer, Philadelphia, Pa., assignor to Minneapolis-Honeywell Regulator Company, Minneapolis, Minn., a corporation of Delaware
Filed June 2, 1959, Ser. No. 817,504
3 Claims. (Cl. 88—14)

This application relates to a radiant energy measuring apparatus having a radiant energy transmitting light guide for obtaining a continuous accurate measurement of changes taking place in density and/or specific gravity or composition of a fluid that is flowing over the peripheral surface of this guide and particularly concerns itself with an apparatus for taking these measurements accurately even under certain adverse measuring conditions such as when there is present certain bands of radiant energy which will be absorbed in an abnormally large quantity by the fluid under measurement.

In the prior art, conventional light guide measuring devices have been employed to make density and/or specific gravity measurements of a fluid by recording the integrated changes taking place in the index of refraction of the combined fluid and light guide in terms of the quantity of light that is lost to fluid that is in contact with the light guide. In the use of such prior devices, it has been discovered that whenever one or more strong absorption bands of radiant energy are present in the light that is being transmitted through such a light guide and into the fluid, it is not possible to obtain a true or accurate reading of the density and specific gravity of the fluid with such an index of refraction measuring apparatus. The reason for this is that an abnormally large amount of the radiant energy will be absorbed by the fluid whenever such strong absorption bands are present and the radiant energy which then is transmitted from the guide to the fluid cannot correctly be correlated with integrated changes taking place in the combined index of refraction of the guide and fluid. Such correlation is an essential requirement for the correct operation of the known prior art index of refraction measuring apparatus.

It is thus one of the primary objects of the present invention to provide a fluid filter for a radiant energy transmitting apparatus which brings about a reduction in the level of intensity of the aforementioned strong absorption bands to a lower level of intensity before transmission of the radiation through the radiant energy guide to the end that a correct and accurate specific gravity and/or density or composition measurement of the fluid surrounding the guide is obtained without interference from such strong absorption bands.

It is another object of the present invention to provide a single fluid filter of the aforementioned type which is comprised of a transparent container having the same type of fluid whose specific gravity, density or composition is to be measured retained therein.

It is still another object of the present invention to provide a fluid filter of the aforementioned type which will substantially reduce the amount of the aforementioned strongly absorbed type of wave lengths of radiant energy which can flow into a radiant energy transmission rod and fluid medium that surrounds the rod to a very small intensity level without substantially changing the characteristic of the source from which this radiant energy is derived.

It is still another object of the invention to provide a measuring apparatus of the aforementioned type in which an economical fluid filter is employed to facilitate an accurate measurement of the energy of the normal dispersion spectrum and the index of refraction of any continuously flowing fluid which contains strong absorption bands.

In the drawing:
FIGURE 1 shows one embodiment of the present invention;
FIGURE 2 shows another embodiment of the present invention, and
FIGURES 3 and 4 show that the presence of radiant energy at certain wave lengths will be abnormally absorbed by fluids which they are brought in contact with in regions of anomalous dispersion.

In FIGURE 1 of the drawing, there is shown a fluid-analyzing apparatus which is generally designated as reference numeral 10. This apparatus comprises an electromagnetic energy source which is schematically indicated as a light source 12 which derives its electrical energy by way of the conductors 14, 16 from a constant power supply source 17. The source of energy is arranged to provide radiant energy at unvarying intensity over a broad band of frequencies. Positioned immediately in front of the light source 12, there is a filter chamber 19 made of a transparent material. The cross sectional area of the fluid space within this chamber 19 is of a sufficient thickness that it will insure large reduction in the intensity of wave lengths which coincide with the aforemenitoned strong absorption bands of the fluid under measurement. In alignment with the light source and immediately to the right of the chamber 19, there is shown the left end of a radiant energy transmitting guide 20. Located along the length of the guide 20 and surrounding this guide, there is shown in cross-section a jacket 21 whose side walls 22, 24 are separated from the guide by means of O-rings 26, 28. The walls 22, 24 of the jacket 21 are fixedly supported in such a manner that the only function of the O-rings 26, 28 will be to engage the outer surface of the guide 20 in a pencil-ring-shaped contact manner so as to seal off the guide portion that extends between the walls 22, 24 from the remaining portions of the guide 20.

A fluid from a flow line, not shown, whose specific gravity, density or composition measurement is to be taken by the apparatus shown in FIGURE 1, flows in the direction of the arrows 30 into conduits 32 and 34, into the jacket 21—26 by way of inlet port 36 formed in the peripheral wall of the jacket 21 and then out of the jacket by way of outlet port 38 and the conduit 40 fixedly connected thereto in the direction of the arrow 42 and thence into another branch of the flow line.

The fluid flowing in the direction of the arrow 30 in conduit 32 also simultaneously flows through the left end of the conduit 34 by way of the inlet port 44 into the chamber 19, out of this chamber by way of the outlet port 46 into the conduit 48 and then flows in the direction of the arrow 50 back into another portion of the aforementioned last-mentioned flow line.

The right end 52 of the guide 20 is directly in front of and spaced slightly to the left of a thermopile 54. Specifically, the thermopile is basically a thermopile of the type which is disclosed and claimed in the Harrison et al. Patent No. 2,357,193.

The light sensing element 56 of the thermopile 54 is connected by way of conductors 58, 60 to a meter 62 calibrated to measure either specific gravity, density or composition of the fluid. The meter 62 is of a well-known self-balancing null type such as that which is disclosed in the Will's Patent 2,423,540, filed December 1, 1941, issued July 8, 1947.

FIGURE 1 of the drawings schematically shows an enclosure 64 entirely encompassing most of the component parts so far described so that stray light or any foreign matter from any external source will be prevented in coming in contact with, for example, any unprotected peripheral side wall portion of the radiant energy transmitting guide 20.

With this FIGURE 1 arrangement, a change in index of refraction and/or specific gravity, density or composition of a test fluid within jacket 21 may be noted by observing the degree to which the pointer 63 has been moved to the right or left of its solid line, zero or null position. In this way, an observer of such an instrument 62 may be able to determine whether the loss of radiant energy sensed by the sensing element 56 is decreasing or increasing from a predetermined null or twelve o'clock zero position. He can thus observe when making such a reading, the degree of change that is taking place in the specific gravity, density or composition of the fluid under measurement.

FIGURE 2 of the drawing shows a partial section of a jacket, light guide and enclosure which have the same reference numerals and are identical to the jacket 21, light guide 20 and enclosure 64 shown in FIGURE 1. Although it is not shown in FIGURE 2, it should be understood that the apparatus disclosed in this figure utilizes the same type of output conduits 40, 48, radiant energy source 12, filter 14, thermopile 54 and meter 62 as that previously described in regard to the description of FIGURE 1 supra.

FIGURE 2 differs from FIGURE 1 in that the inlet port of jacket 21 has the lower end of a conduit 68 integrally connected thereto. This conduit 68 in turn has two branch conduits 70, 72 connected to it at its upper end in lieu of a single conduit 34 as in the FIGURE 1 arrangement.

The upper end 74 of branch conduit 70 is connected to a flow of fluid passing through a first flow line, not shown. A portion of this fluid is indicated as passing in the direction of the arrow 76 into the conduit 74 through branch conduit 70 into the interior of jacket 21 by way of conduit 68. Another portion of this fluid flowing in the direction of the arrow 76 passes into the conduit 78 through the two position valve 80 out of the valve in the direction of the arrow by way of conduit 82 into and thence out of a filter in a manner similar to that shown for the filter 19 and its inlet and outlet connections 44, 46 in FIGURE 1 of the drawing.

The upper end 84 of branch conduit 72 is connected to a flow of fluid in a second flow line, not shown. This fluid is indicated as passing in the direction of the arrow 86 into the conduit 84 through branch conduit 72 into the interior of jacket 21 by way of conduit 68. A portion of the fluid flowing in the direction of the arrow 86 also flows into the conduit 88 through the two position valve 90 out of the valve in the direction of the arrow by way of conduit 92 into and thence out of a filter in a manner similar to that shown for the filter 19 and its inlet and outlet connections 44, 46 in FIGURE 1 of the drawing.

It should be understood that it is also possible from the present disclosure to employ a plurality of branch conduits similar to the aforementioned conduits 70, 74 and 84, 72 which conduits could each be operably connected to an independent flow line at one of their ends and to both a branch conduit and a filter by way of a valve at each of their other ends. However, for the purpose of the specification, only two such branch conduit flow line connections have been illustrated in the drawing. This arrangement is such that either one or the other of the valves 80, 90 can be opened while the other is closed.

When radiant energy in the form of light is passed through a light guide and into a fluid in contact therewith whose specific gravity, density or composition is subject to change, a predetermined measurable relationship is established between the changes occurring in the magnitude of the specific gravity, density or composition of the fluid and the amount of the emitted energy that is lost to the fluid.

In these types of specific gravity, density or composition measuring apparatus, it has heretofore been assumed that the relationship between this lost energy and the type of measurement being taken is due to the net change in index of refraction or, in other words, the integrated index change which takes place between the guide and the fluid. As long as this relationship is maintained, such index of refraction measurements will represent a fairly true measurement of any change in magnitude of the specific gravity, density or composition of the fluid that is being measured. However, correct measurements of integrated index are possible only as long as the index of refraction existing between the fluid and the guide vary smoothly and monotonically with the wave lengths being transmitted.

Applicant discloses in FIGURES 3 and 4 of the drawing, a graph which shows that as certain bands of radiant energy of predetermined wave lengths are transmitted through the aforementioned light guide, they will be absorbed in an abnormally large quantity by the fluid under measurement. Such strong absorption of this radiant energy is indicated as taking place at the wave length indicated by the vertical dash line 94 in FIGURES 3 and 4 as well as at those wave lengths which are slightly to the right and left of this line. Certain fluids absorb abnormally large amounts of the aforementioned radiant energy in the ultraviolet band region while other fluids display this abnormally strong radiant energy absorption characteristic in the visible or the infra-red regions. The vertical dash line 94 shown in FIGURES 3 and 4 of the drawing therefore represents any selected wave length in either the ultraviolet, visible or substantial portions of the infra-red band regions in which the particular fluid, whose specific gravity or composition is being measured, will display an abnormally strong absorption characteristic. FIGURE 4 shows that if in the aforementioned wave length area such strong absorption bands are present, the index will suffer a discontinuous change in that wave length region. It can thus be seen that the previously referred to relationship between changes taking place in the magnitude of the specific gravity, density and/or composition of the fluid and the amount of emitted energy that is lost to this fluid does not, therefore, exist in anomalous dispersion regions where these strong absorption bands are present. Any measurement which would be taken in such a region of anomalous dispersion would not, therefore, be a true measurement of the change in specific gravity, density or composition of the fluid that is taking place in this region.

To obviate the aforementioned difficulty, applicant provides in FIGURE 1 an arrangement in which a filter 19 is placed between the radiant energy source 12 and the end of the aforementioned light guide 20 through which fluid under measurement passing in the direction of the arrow 30 is allowed to continuously flow. With this arrangement, no absorption bands of energy which would normally be strongly absorbed by the fluid passing through the inside of the jacket 21 will be transmitted to the fluid. Since the fluid flowing through the filter 19 has the same characteristics as the fluid flowing through the jacket 21, the light that has passed through the filter will thus be void of any wave lengths which the fluid in the jacket 21 would strongly absorb in abnormally large quantities.

The fluid filter 19 is thus useful in that it automatically and continuously prevents bands of radiant energy from being passed through the radiant energy transmitting guide which bands cause discontinuous inaccurate specific gravity, density or composition measurements to occur when these measurements are made particularly in such anomalous dispersion regions referred to supra. This filter 19 will thus permit accurate index of refraction and normal dispersion measurements of the fluid to be taken in regions where any abnormally strong absorption of energy takes place.

The index and absorption measurements which are made when the aforementioned filter 19 is used will thus represent a true measurement of the specific gravity, density or composition measurement of the fluid as no abnormally strong absorption will be present as is the case when index measuring apparatus such as refractometers are used for this purpose.

Furthermore, such a liquid filter arrangement 19 eliminates the necessity of replacing one type of single band filter for another when fluids having different index of refraction and different strong absorption characteristics are used. Any type of light that is passed through the filter 19 can be desensitized to those bands of energy which would normally be strongly absorbed by the fluid being measured if such a filter were not present.

It is thus evident that accurate measurement of the specific gravity, density or composition of any fluid can be accomplished with the apparatus disclosed in FIGURE 1 of the drawing by merely permitting the fluid under measurement to be fed through the conduit 32 so that similar characterized portions thereof can be simultaneously passed through the right and left portions of conduit 34 and into and through the jacket 21 and filter chamber 19 to which each end of these conduit portions are connected.

While FIGURE 1 illustrates an apparatus in which the accurate specific gravity, density or composition of a continuously flowing fluid can be readily measured, it should be understood that the lower ends of the conduits 40, 48 could be sealed off by a valve or any other plug means so that the apparatus could then readily rend itself to batch measurement, or in other words, to an apparatus in which intermittent measurements of the specific gravity, density or composition of small test samples of a fluid could be made.

FIGURE 2 of the drawings shows another modified form of the apparatus from that which is disclosed in FIGURE 1 in that it shows how a first fluid flowing in the direction of the arrow 76 in the conduit 74 from a first flow line, not shown, can be combined with a second fluid flowing in the direction of the arrow 86 into conduit 84 from a second flow line, not shown.

A first portion of both the first and second fluids passing through their respective conduits 74, 84 are fed through the associated branches 70, 72 of a Y-shaped conduit 68 where they are mixed with one another before flowing into the jacket 21 as the solution to be measured.

Another remaining portion of the first fluid passing through the conduit 74 is fed through the conduit 78, valve 80 and conduit 82 to a filter such as is identified as reference numeral 19 in FIGURE 1 in order to eliminate any radiant energy bands, which without such a filter would be strongly absorbed by the measured fluid in the jacket 21.

The other remaining portion of the second fluid passing through the conduit 84 can also flow through the conduit 88, valve 90, conduit 92 through a filter. This filter may be similar to the fluid filter 19 shown in FIGURE 1 in order to eliminate any radiant energy bands, which without such a filter would be strongly absorbed by the measured fluid in the jacket 21.

It can further be seen from the aforementioned description that in the apparatus disclosed in FIGURE 2 of the drawing either one or the other or both of the valves 80, 90 may be opened so that one of the selected fluids or both fluids may flow into the filter 19 and thus prevent bands of radiant energy from being transmitted to the fluid in the jacket 21 which will be strongly absorbed by either the first and/or the second fluid which forms the solution in the jacket 21.

Although FIGURE 2 utilizes a filter arrangement 19 which desensitizes the transmitted bands of radiant energy of the strong absorption bands of only a first and/or second fluid in order to make an accurate specific gravity, density or composition measurement, it should be understood that desensitizing of strong absorption bands of additional fluids in other flow lines may also be accomplished by merely connecting the flow of fluid in each of these additional flow lines through, for example, the conduit 68 and a common filter 19 in a manner similar to that already described for the first and second fluid flows referred to supra.

It can thus be seen from the aforementioned disclosure, that the filter apparatus disclosed herein is useful in desensitizing, or in other words, eliminating certain bands of radiant energy from being transmitted from a radiant energy source 12 through a guide 20 and into a fluid which is in contact with this guide which desensitized bands would, without such a filter, be strongly absorbed by the fluid.

From the aforementioned description of the analyzing apparatus shown in either FIGURE 1 or 2, it can be seen that each form of the filter apparatus disclosed in these figures provides an economical way of measuring the specific gravity and/or density or composition of a fluid medium accurately in terms of its true integrated index or, in other words, index of refraction and normal dispersion spectrum characteristics as changes in the specific gravity and/or density or composition of this medium occurs regardless of whether the fluid medium is a single fluid or a solution which is comprised of a plurality of fluids.

What is claimed is:

1. An improvement in specific gravity measuring apparatus by taking a continuous measurement of the integrated index of refraction of a sample portion of a continuously flowing stream of fluid passing through a first chamber which fluid contains strong absorption bands in either the ultraviolet, visible or substantial portions of the infra-red regions when said fluid is under the condition in which light from a constant light source is being introduced into one end of a solid transparent medium and then partially refracted from another surface of said transparent medium into a portion of the continuously flowing fluid that is flowing through said first chamber, said improvement comprising a filter positioned between said light source and said one end of the transparent medium, said filter having an open ended second chamber provided with a thin transparent wall whose inside surface forms a fluid passageway which is of a preselected thickness, said filter further comprising a fluid transmitting conduit operably connected at one of its ends to one end of said second chamber and having a remaining portion connected to said sample portion of said continuously flowing stream of fluid thereby to provide for the same continuous flow of said fluid which is the same quality through said second chamber as that flowing through said first chamber, said fluid filter providing a means, when said light from said light source is passed therethrough, to substantially reduce only the strength of the bands of light emitted from said source to a very small intensity level that would otherwise be strongly absorbed by said fluid before the light is introduced into the one end of said transparent medium, and a thermopile positioned immediately adjacent the opposite end of said transparent medium to accurately measure the amount of light passing out of the last-mentioned end of said transparent medium solely in terms of said integrated index of refraction of said fluid.

2. An improvement in an apparatus to measure the specific gravity of a flowing fluid in terms of its electromagnetic radiation absorption characteristics, wherein a light source of constant intensity is employed to emit light bands of radiant energy including those which lie within the ultraviolet, visible and substantial portions of the infra-red regions and wherein one of said light bands is strongly absorbed by said flowing fluid when light from said light source is transmitted through an elongated solid light guide that has a peripheral portion in contact with said flowing fluid, said improvement comprising a filter positioned between said light source and one end of said guide, said filter having a transparent chamber whose inside surface forms a fluid passageway which is of a preselected thickness, a flowing fluid passing through said passageway that is substantially identical in quality of said flowing fluid that is in contact with said light guide, said flowing fluid filter affording transmission by internal reflection into said light guide of only said light bands of radiant energy emitted by said light source which are not strongly absorbed by said flowing fluid that is in contact with said light guide, a thermopile to sense the light bands of radiant energy which are not strongly absorbed by said flowing fluid in contact with said light guide as said last-mentioned radiant energy passes out another opposite end of said light guide and a self-balancing null indicating means operably connected to said thermopile to indicate the specific gravity of said flowing fluid in terms of said light bands of radiant energy emitted by said light source which are not strongly absorbed by said flowing fluid.

3. An improvement in an apparatus to measure the composition of a flowing fluid in terms of its electromagnetic radiation absorption characteristics, wherein a light source of constant intensity is employed to emit light bands of radiant energy including those which lie within the ultraviolet, visible and substantial portions of the infra-red regions and wherein one of said light bands is strongly absorbed by said flowing fluid when light from said light source is transmitted through an elongated solid light guide that has a peripheral portion in contact with said flowing fluid, said improvement comprising a filter positioned between said light source and one end of said guide, said filter having a transparent chamber whose inside surface forms a fluid passageway which is of a preselected thickness, a flowing fluid passing through said passageway that is identical in quality of said flowing fluid that is in contact with said light guide, said flowing fluid filter affording transmission by internal reflection of only said light bands of radiant energy emitted by said light source into said light guide which are not strongly absorbed by said flowing fluid that is in contact with said light guide and a thermopile to sense the light bands of radiant energy which are not strongly absorbed by said flowing fluid in contact with said light guide as said last-mentioned radiant energy passes out another opposite end of said light guide thereby to provide a measure of the composition of said flowing fluid solely in terms of light bands of radiant energy emitted from said light source which are not strongly absorbed by said flowing fluid that is in contact with said light guide.

References Cited in the file of this patent

UNITED STATES PATENTS

| | | |
|---|---|---|
| 1,550,197 | Berry | Aug. 18, 1925 |
| 2,245,124 | Bonn | June 10, 1941 |
| 2,324,304 | Katzman | July 13, 1943 |
| 2,431,019 | Barnes | Nov. 18, 1947 |
| 2,569,127 | Eltenton | Sept. 25, 1951 |
| 2,624,014 | Barstow | Dec. 30, 1952 |
| 2,721,942 | Friel et al. | Oct. 25, 1955 |
| 2,905,823 | Sparks | Sept. 22, 1959 |
| 2,964,993 | Witt | Dec. 20, 1960 |